(12) United States Patent
Penoyer (10) Patent No.: US 6,460,028 B1
(45) Date of Patent: Oct. 1, 2002

(54) SYSTEM AND METHOD FOR DATA ORGANIZATION

(75) Inventor: Robb B. Penoyer, Stratford, CT (US)

(73) Assignee: T4MUPJ2, LLC, Standford, CT (US)

( * ) Notice: Subject to any disclaimer, the term of this patent is extended or adjusted under 35 U.S.C. 154(b) by 0 days.

(21) Appl. No.: 09/454,977

(22) Filed: Dec. 3, 1999

(51) Int. Cl.⁷ .............................................. G06F 17/30
(52) U.S. Cl. ......................................................... 707/2
(58) Field of Search ............................ 707/2, 509, 530

(56) References Cited

U.S. PATENT DOCUMENTS

| | | | | |
|---|---|---|---|---|
| 5,115,504 A | | 5/1992 | Belove et al. ............... | 395/600 |
| 5,133,068 A | | 7/1992 | Crus et al. ................... | 395/600 |
| 5,303,367 A | * | 4/1994 | Richard et al. | |
| 5,555,409 A | * | 9/1996 | Edwin et al. | |
| 5,749,080 A | | 5/1998 | Matsumoto et al. ......... | 707/100 |
| 5,787,440 A | | 7/1998 | Bakke et al. ................ | 707/103 |
| 5,819,280 A | | 10/1998 | Nagai .......................... | 707/103 |
| 5,909,688 A | | 6/1999 | Yoshioka et al. ............ | 707/202 |
| 5,924,098 A | | 7/1999 | Kluge .......................... | 707/100 |
| 5,987,103 A | * | 11/1999 | Rocco | |

* cited by examiner

Primary Examiner—Safet Metjahic
Assistant Examiner—Haythim J Alaubaidi
(74) Attorney, Agent, or Firm—Arter & Hadden LLP (57) ABSTRACT

A system for organizing and accessing information includes the provision of an information gateway wherein information is stored independently of structure, and in a fashion such that it is easily accessible from remote locations. In the system, an information atom is received from a plurality of information gateways. The atom includes data representative of one or more data elements, as well as relationship associated with received atoms according to pre-selected definitions. The definitions set include allowable data values and allowable inferences. The atom is adapted for being stored in an information gateway so as to maintain relationship data between an atom and an associated gateway. The system selectively allocates data storage for a pointer and a data element. Viewpoint data is retrievable from a query of an atom.

2 Claims, 5 Drawing Sheets

NAMES

| IDENTIFIER | NAME | ADDRESS | RELATIONSHIP |
|---|---|---|---|
| 1 | BOB | ONE ST | 3 |
| 2 | MARY | TWO ST | 2 |
| 3 | DAVID | THREE ST | 3 |
| 4 | RITA | FOUR ST | 1 |
| 5 | CAROL | FIVE ST | 2 |

INVENTORY

| IDENTIFIER | ITEM NAME | PRICE |
|---|---|---|
| 1 | RING | 1000.00 |
| 2 | HAT | 50.00 |
| 3 | SHOES | 75.00 |

COMMON TABLE

EMPLOYEE
NAME
DATE OF BIRTH
TELEPHONE NUMBER
STREET ADDRESS
CITY
STATE
ZIP CODE
START DATE
SALARY

INFORMATION MODEL

EMPLOYEE
START DATE
SALARY
PERSON

*Fig. 3*

NAMES

| IDENTIFIER | NAME | ADDRESS | RELATIONSHIP |
|---|---|---|---|
| 1 | BOB | ONE ST | 3 |
| 2 | MARY | TWO ST | 2 |
| 3 | DAVID | THREE ST | 3 |
| 4 | RITA | FOUR ST | 1 |
| 5 | CAROL | FIVE ST | 2 |

INVENTORY

| IDENTIFIER | ITEM NAME | PRICE |
|---|---|---|
| 1 | RING | 1000.00 |
| 2 | HAT | 50.00 |
| 3 | SHOES | 75.00 |

SYSTEM AND METHOD FOR DATA ORGANIZATION

FIELD OF THE PRESENT INVENTION

The invention relates to systems and methods for organizing and accessing information. More specifically, the invention relates to an information gateway which comprises robust systems and methods for managing information, wherein information is stored independent of structure and may be easily accessed from remote geographical locations.

BACKGROUND OF THE INVENTION

A database is a set of algorithms used to manage data. In general, the collection of data is structured and organized in a formal fashion so as to allow a user to easily access information of interest. Typically, data elements are grouped together into structures called tables that are organized according to their association with other related information. In the database context, a table is a structure that defines a set of data or grouping of fields, wherein a field is the basic building block of the table structure. For example, it is normal to group the data field "PERSON NAME" with "SOCIAL SECURITY NUMBER" into a table due to their obvious relationship.

Databases use tables to establish a mechanism of mass storage and retrieval while minimizing performance penalties imposed by technology. An alternative structure well known in the database art is a hierarchical structure. This structure builds upon the premise that all data has a parent, with the exception of the "top level" element. For example, a category called "EMPLOYEE" may have as its children the categories, "Name," "Address," and "Position" as its children. In this example, "EMPLOYEE" is the parent and the remaining elements are the children of the parent. In addition, the relationship between the children on the same level is known as "siblings." While conceptually feasible, hierarchical structures suffer from significant performance issues when non-predicted operations are practiced. This is most commonly seen when a user requests data, which is deeply imbedded into the hierarchical tree structure.

As databases and their associated structures have evolved over the past decade, advanced mechanisms have been developed to enhance the ability to retrieve data. Among these advances are the use of indexing and the creation of relationships, both of which are dependent upon the standard architecture of current database technology.

Indexing is a method by which the order and representation of data elements, based upon their value, is rearranged to support a faster search or retrieval algorithm. For example, in the structure of Morse Code, the character 'e' is a simple period '.', and the character 'y' is a sequence of '-.—'. This translation is very simple for more common characters, like 'e', and likewise more complex for less frequently used characters, like 'y'. By applying a simple reference to commonly used values, their reference is faster and more easily maintained, however, insuring all possible combinations are encompassed incurs a larger overhead to support less commonly used values.

Relationships are an advanced form of indexing. Two distinct indexes can be merged into a larger index creating a value based relationship. This has two advantages, it allows two normally disassociated values to be related to each other, and makes preparation for faster retrieval of the data. This is commonly referred to as a "join" within a database, and usually occurs between two tables.

For a database technology to be complete, it must maintain a method of storing its structure and data to some sort of persistent media device. The classical implementation requires storage to be maintained at the table level, for structure, and the row level for data content. Indexes and relationships are therefore stored as part of the table for index structures, and the rows for relationship data.

None of the current market databases disassociate structure and content from the data row definitions associated with tables. This requirement is especially important today, as software applications have evolved into integrated packages and user demands require multiple platform compatibility in order for seamless operation across remote geographical locations. Accordingly, user demand requires software packages to link, access, modify, import, insert, and delete data from different databases and platforms.

Problems with the classical database approach arise from the mandatory table structure imposed by the architecture. Generally, the databases require the definition of a table structure to support the ability to store the data to a persistent media, create and manage indexes, and create and manage relationships. However, this physical requirement impacts the ability to efficiently support insertion, retrieval, linking, updating, and deletion of data items from distinct databases. For any of these activities to work without corrupting the rest of the data, the basic storage unit (row) and its structure (table) must be maintained. While it is very efficient to retrieve multiple data elements from a singular table, significant overhead is imposed, with regards to performance and complexity, when retrieving data across the basic structure definitions (tables). This overhead is typically addressed with very- complex structures and algorithms in the form of indexes and relationships which are dependent upon the basic architecture for consistency.

Since the overhead and resulting complexity of maintaining operations across the basic structure unit (table) is so complex, association of data between databases is only done with the addition of non-database algorithms, called interfaces. In general, an interface is written to access from DATABASE-1, and then based on the resultant data set, access DATABASE-2. The development of these interfaces are costly, inefficient, and not robust, i.e. a separate interface is needed for linking a database with any other database platform.

The present invention addresses these and other information management problems encountered in the prior art, to provide a robust system and method of organizing and accessing data across distinct platforms.

SUMMARY OF THE INVENTION

According to the present invention, there is provided an information management system and method comprising: a receiving means adapted for selectively receiving an atom from each of a plurality of associated information gateways; an association means adapted for generating the relationship associated with received atoms in accordance with parameter data representative of pre-selected definitions specifying at least one of allowable data values and standard allowable inferences; a storage means adapted for storing at least one atom in at least one information gateway such that associated relationship data between at least one atom and a related atom in a corresponding information gateway is maintained and the at least one atom is stored in accordance therewith; an allocation means adapted for allocating data storage within the storage means for at least one of a pointer, and data element; wherein the relationship is populated with data associated with the related atom; a retrieving means adapted for retrieving viewpoint data resultant from a query of at least one atom in at least one information gateway together with data representative of identified relationships, wherein the data representative-of identified relationships selectively includes at least one of the data elements and relationship data associated with the viewpoint data; and an output means adapted for outputting data and relationship data associated with viewpoint data.

An advantage of the present invention is the ability to store data independently of database structure.

Another advantage of the present invention is the ability for seamless operation between remote and distinct databases.

Still another advantage of the present invention is provide a robust system and method of organizing and accessing data across distinct platforms by substantially reducing or completely eliminating the requirement of application specific interfaces.

DETAILED DESCRIPTION OF THE PREFERRED EMBODIMENT

An information gateway is not a database in the classical sense. The basic unit for both structure and storage is a singular unit called an "atom". An atom is a singular definition for one or more pieces of data and their associated inference slots or plugs. The creation of an atom involves two steps, first the creation of a theoretical wire frame structure which contains information regarding the allowable values and standard allowable inferences. This need only be defined once within the information gateway. This is similar to the periodic table, which defines the necessary quantity and orientation of protons, neutrons and electrons necessary to make up any of the basic elemental particles. Like the periodic table, in defining an atomic structure in an information gateway, the allowable combinations of the element, either with other elements of the same type, or of different types, is dictated by the availability of a "plug in slot." For example, two hydrogen atoms may combine with a single oxygen atom due to the fact that the oxygen atom has two available "slots" for protons at the highest valence level represented. Every hydrogen atom, has only one proton, and therefore two hydrogen atoms may be associated with one oxygen atom and remain stable. The information gateway approaches the classical database relationship issue in much the same way. At the time of definition for an atom in an information gateway, a standard set of allowable inferred relationships, called inference plugs, are defined. An inference plug is an adapter that associates with an atom which allow an inference relationship to be .defined. For example, when the elemental datum structure for a persons name is defined, an inference plug for the persons social security number is entered into the atom. The information gateway further expands this concept of inferred information by allowing every inference plug in an atom to be assigned one or more priorities, called an inference level, which is similar to a valence level in chemistry. This allows operations against the information gateway to traverse strings made up of inferences at specific levels. For example, an update operation, discussed infra, will only target atoms and inference levels with a specific inference level, without impacting the remaining inferences.

To retrieve data from within an information gateway, one must request responses based upon intent rather than expected structure. For example, in a classical database, the user seeking to obtain data associated with a person, requests all the data from a specific row within the data table where the "PERSON NAME" element is equal to the person they are looking for. This implies the user comprehends the structure and content of their target data. In the information gateway, to get the same information, the user would request an inference string response against the "PERSON NAME" atom which is equal to the name they are looking for, the "PERSON NAME" atom in this scenario is referred to as the point of view. The method of requesting an inference string is called "saddle select" and the "point of view" refers to an atom or atomic datum at which an inference begins. In this example, the returned information set would include all the information contained in atoms with inferences to the "point of view" atom, and subsequent inferences to those atoms, an so on until there are no more inferences which have not been traversed. When there are no more inferences to be traversed this is known as branch termination. In this example, the same user would not only get the persons name and social security number, they would also get all of the data associated or related with that person. That is, the information gateway returns a complete information set, all inferences, regardless of inference level by default, which can be limited to specific subsets by either specifying an inference level, or parsing the complete information set after the saddle select completes.

Referring now to the drawings wherein the purpose of such drawings is solely for illustration a preferred embodiment of the invention and not for the purposes of limiting the invention.

Figure 1:
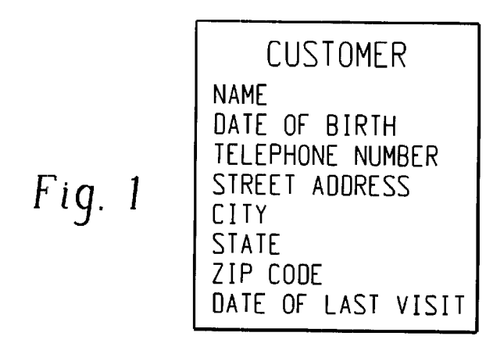
FIG. 1 is classical database model representation of a CUSTOMER.

FIG. 1 illustrates the classical database approach. In this prior art model, a "CUSTOMER" record consists of a "Name", "Date Of Birth", "Telephone Number", "Street Address", "City", "State", "Zip Code", and "Date Of Last Visit". These data elements would be collected and stored as complete sets in either a table or a hierarchical form.

Figure 2A:
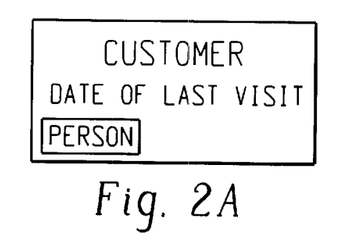
FIG. 2A is the first iteration of the of the information gateway management model representation of a CUSTOMER.
Figure 2B:
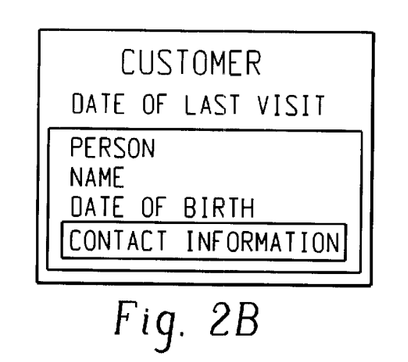
FIG. 2B is the second iteration of the information gateway management model representation of a CUSTOMER.

FIG. 2A illustrates the first iteration of the information gateway model. A "CUSTOMER" consists of a "PERSON" and the atomic data element, "Date of Last Visit." The second iteration shown in FIG. 2B, further breaks "CUSTOMER" down to more discreet lower level atoms. In the second iteration, a "PERSON" consists of "CONTACT INFORMATION," and the atomic elements, "Name" and "Date of Birth." FIG. 2C further defines "CUSTOMER" and completes the method representation of information by expanding "CONTACT INFORMATION" into the atomic elements "Street Address," "City", "State", "Zip Code", and "Phone Number".

Figure 2C:
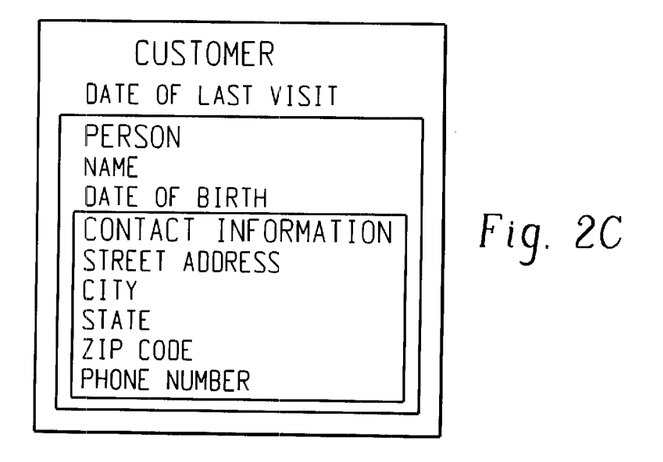
FIG. 2C is the final iteration of the information gateway management model representation of a CUSTOMER.

While the storage of data elements in the data management method is by means of tables of row data. A row consists of all data elements for a customer. A column consists of a specific data element for all customers, the storage of data elements in the information gateway method is vastly different. Every atomic datum is stored individually with relationship information to its primary information set, for example, "Phone Number" is stored with a relation to "CONTACT INFORMATION". Each information set, such as "PERSON" or "CONTACT INFORMATION", is stored with a relationship to associated information sets. For example, "PERSON" is stored with relationships to "CUSTOMER" and to "CONTACT INFORMATION".

Figure 3:
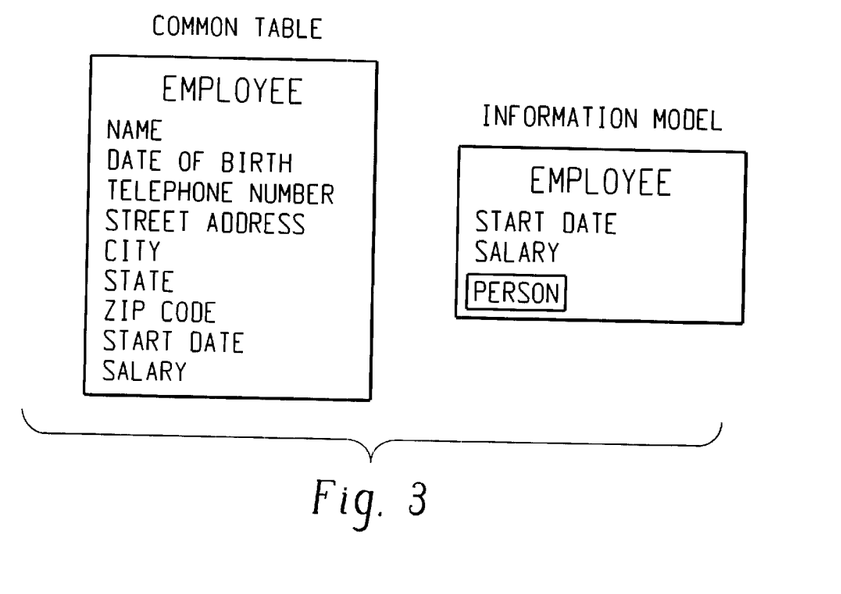
FIG. 3 illustrates an EMPLOYEE record in both the classical database model and the information management model.

When the information gateway management method is used, information sets become ubiquitous to their specific usage. Expanding the example even further, turning to FIG. 3, suppose a model was needed to represent the store employees. The information gateway simply breaks an "EMPLOYEE" into a "PERSON", an employment "Start Date" and "Salary". This would constitute the entire work necessary to represent a store employee. The standard data representation would create an entirely new representation for the employee. The information gateway does not reproduce a representation for a person, it simply-infers a relationship to the pre-existing person representation.

Figure 4:
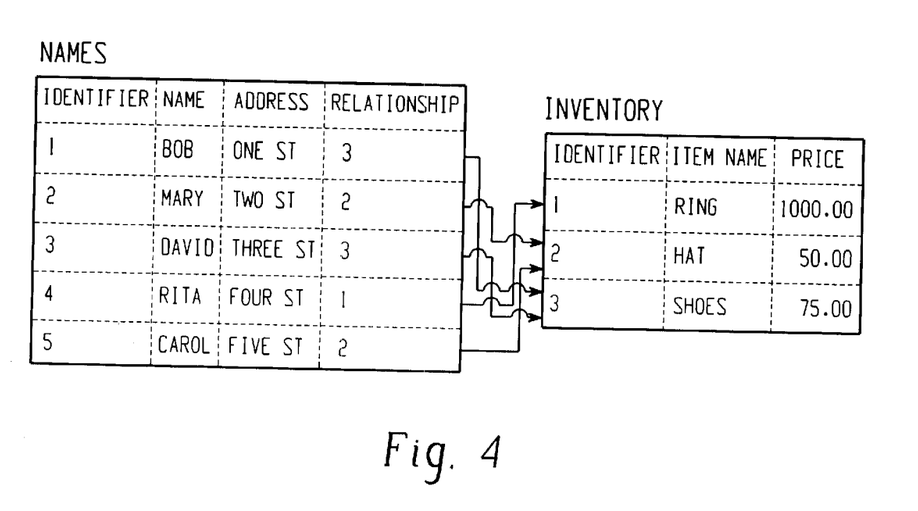
FIG. 4 illustrates the classical database model representation of relationship data.
Figure 5:
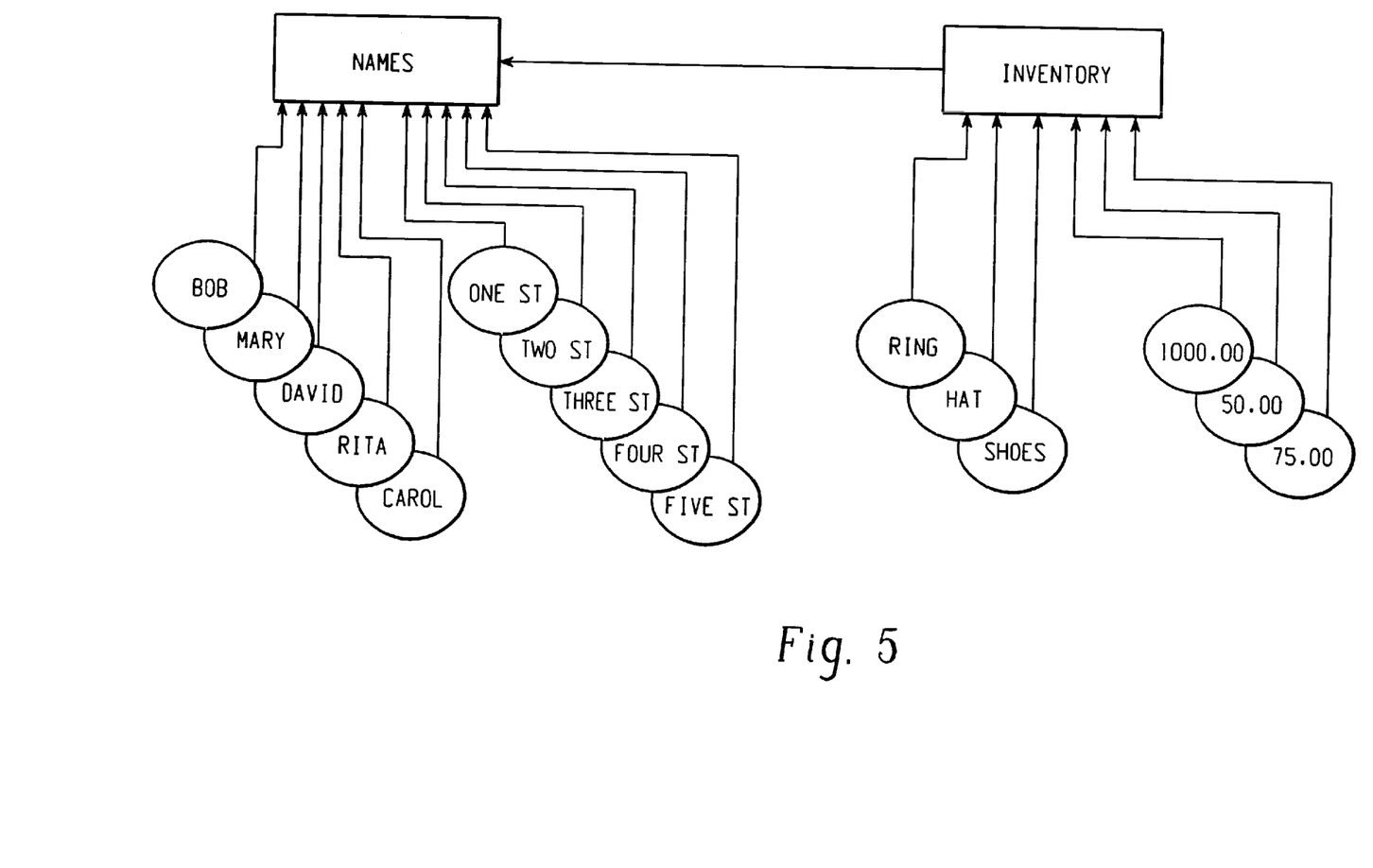
FIG. 5 illustrates the information gateway model representation of relationship data.

Referring to FIG. 4, the classical database approach for dealing with relationships is shown. A relationship. is an indicator within either a data element, an information set, or an access point of view, which relates data elements and/or information sets, to information sets. In the common industry data modeling methods, a relationship is represented with a key column in a table which holds the identifier for a specific row in a second table. In contrast, FIG. 5 illustrates that the information gateway does not represent relationships with additional data elements. Rather, a relationship is represented as a component of a data element or information set. FIG. 5 further depicts an information map that allows the addition and subtraction of data from storage based upon its relationship to other data, rather than a specific storage space as in the classical database.

Figure 6:
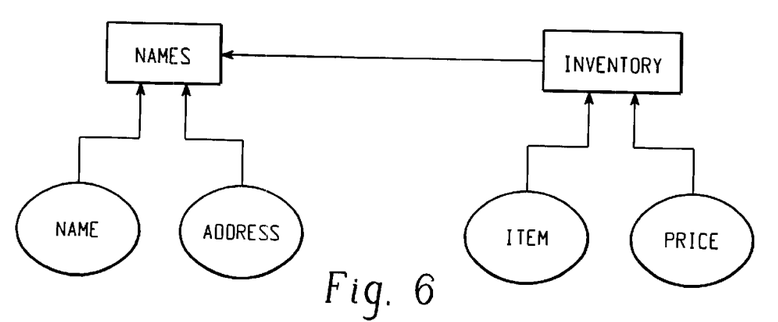
FIG. 6 illustrates the information gateway model data interrelationship representation.

FIG. 6 illustrates how the "CUSTOMER" and "INVENTORY" data shown in FIG. 4 is represented under the information gateway model. For further clarification, consider the following: suppose the user desires to know what the customer named "Bob" purchased, and how much he paid, how does the information gateway determine the answer? The data element "Bob" maintains a relationship to the "NAMES" primary information set. The "NAMES" information set maintains two relationships, one to the "Address" data set, and one to the "INVENTORY" information set. When the "Bob" data element was added to storage, it allocated space to hold pointers or data in which links to the primary information set, subsequent, information sets, and subsequent data elements within those information sets. As the data associated with "Bob" was added, they also created these links. The links were populated as a function of the addition or removal of related datum.

The above question may also be asked in another manner: 1) What "Items" has "CUSTOMER" "Bob" purchased? and 2) How many "INVENTORY" "Item" "Shoes" have been purchased? Using classical database technology, the answers to these questions would require two distinct data queries. For question number one, the classical database would first select the relationship key from the "NAMES" table where the name is "Bob." Second, select the item name and price from the identifier which is equal to the relationship key selected in step one. For question number two, the classical database would first select the identifier from the "INVENTORY" table where the item name is equal to "Shoes." Second, select the name from the "NAMES" table where the relationship is equal to the Identifier selected instep one.

However, the information gateway model obtains the results in only one access. For question number one, the information gateway model, retrieves the information set related to name "Bob" from the "NAMES" information set. For question number two, the information gateway model retrieves the information set related to item name "Shoes" from the "INVENTORY" information set.

The result of representing information rather than data allows a technological practice which emulates business practice rather than technological capability. The present invention allows data elements to be represented by value and relationship, therefore, users with different purposes can access information based upon need and not availability. For example, a sales forecaster using the example from above, would request information concerning customers. This would result in the data and information sets related to the customer information set being acted upon. A human resources person would request information regarding employees. This would result in the data and information sets related to the employee information set being acted upon. Under the information gateway model, a major benefit over the classical database technology is that both employee and customer information sets are related to the person information set. Thus, both users' activities would result in actions taken against the "PERSON" information set. However, the purpose and the intent for each user are vastly different. This results in optimized access for each user type, without adding additional storage or management overhead.

Since the information gateway requires definition at the atomic datum level, there exists possibilities for inferences to become apparent without explicit definition. This can occur in one of two ways. The first is that all inference plugs are bi-directional. So, when an atom, atom-1, is defined with an inference plug to another atom, atom-2, atom-2 is defined with an inference plug to atom-1 automatically. The result is when atom-2 becomes the focus of a point of view, atom-1 is a potential candidate for the resultant information set. The second way an inference plug may be defined automatically is through disassociation. This is when the definition of a series of atom results in circular inferences or otherwise non-optimized structure. For example, when atom-1 is defined, its definition includes an inference plug for atom-2, which in turn has an inference plug for atom-3, which in turn has an inference plug for atom-1. Thus creating a circular inference string structure. Instead of creating this circular structure, the information gateway would alter the inference configuration to create an inference plug from atom-1 to atom-2, and atom-3. In effect, removing the inference plug between atoms 2 and 3.

In addition, to inference plugs created at definition, the information gateway may also create inference plugs at run time. This allows the information gateway to adapt through common algorithmic methods to user point of view operations. For example, consider a user who, from the previous paragraph's example, is requesting information at an inference level which includes atom-2 and atom-3, but not atom 1. At run time, since there is no direct inference between atom-2 and atom-3, a temporary inference plug between the two atoms is created, based upon the fact that atom-2 and atom-3 are indirectly inferred to each other through atom-1. This in effect, brings the data associated with atom-2 and atom-3 closer together. Such functionality provides for a more efficient retrieval method than prior art databases.

Data Operations within the Information Gateway

Similarly, when considering other data operations, the classical database design again incurs a significant amount of overhead. For example, when deleting a basic storage unit (a row), care must be taken to insure the deletion will not render associated structures, such as indexes or references, invalid. The resulting corruption associated with an invalid index or relationship can be cascading and eventually result in a complete database corruption.

The following illustrates how the data operations of inserting, deleting, and modifying data is accomplished in the information gateway:

Inserting data or information into an information gateway occurs through a point of view data. There are two possible modes of operation; a) with inference leveling; and b) with no defined inference level. With an inference level enabled, the information gateway will create instances of inferred atoms across inference plugs of the specified level whether or not data was specified to be stored in that particular instantiation of the atom. All inference plugs of different inference levels will either be left empty, or, when a data value is specified, connected to the defined atom which is instantiated with the target data. Accordingly, rather than creating a new atom to hold the data, the inference string is connected to existing atoms. When no inference level is defined, all inferred atoms are created and populated with data (when-provided) and their inference plugs are populated until branch termination occurs.

Modifying data or information is performed in a similar manner as the insertion process, except that only changes to the modified point of view data is promulgated.

Deleting information from an information gateway incurs the greatest performance penalty within the information gateway. This is by design due to the fact that once the point of view element is deleted, the primary and subsequent inferences may be traversed by an alternative process which would not impact the performance of the driving process. The basic algorithm for deleting an atom, and associated inferences is simple, if any single inference plug refers to more than one instance of the inferred atom, or the inferred atom definition has multiple instances with references to the point of view atom, the point of view atom and those inferences are preserved. All other inferences are cleared. The process then traverses to the remaining primary inference atoms (and subsequent inferences) and performs the same operation until branch termination. This in effect preserves all data necessary to complete all inference strings regardless of the point of view, but preserves data necessary to complete all unassociated inference strings. By applying an inference level to a deletion operation, the target set of inferences is limited by the level specified, otherwise the algorithm remains the same.

Data Storage and Retrieval

The information gateway maintains pervasive storage both for structure and content through storing the atoms. Atom definitions are stored separately for efficiency, and atom instantiations are stored in random access space. This bifurcation provides for quick startup, load atom definition and atom instantiation, as well as managed update and deletion, definition and instantiation updates. The storage of the atom definition must contain all explicitly defined structural inferences, as opposed to the implicitly defined structural inferences. Similarly, the instantiated atom storage must contain the values of all explicitly defined structural inferences. For further efficiency associated with startup, implicit definitions and values may also be stored.

The information gateway also has the capability to support information set operations across data management entities and with other information gateways. For example, the definition of an atom may be that it contains a method to retrieve a specific data element from a classical database, rather than the data itself. Since the inference plugs are part of the total structure of the atom, the only algorithmic change is that the actual datum is retrieved from classical database storage when requested. This can be accomplished through any of the standard or proprietary techniques supported by the target hosting database or information gateway. Additionally, an atom definition may contain a foreign inference, or in other words, the location of another atom contained in a different information gateway. In this scenario, the foreign inference looks and acts just like any other inference plug on the atom definition.

The idea of a classical database as a data element in an information gateway may be extended. For instance, instead of a singular piece of data represented by a method, an entire data set or table, an index, a relationship, or any combination of these, may equally be represented. Thus, extending the information gateway's functionality to support all previously defined classical database models with no code or algorithmic alteration.

System Requirements and Data Path

As is obvious from the above discussion, the information gateway does not maintain "data paths" in the classical manner, which is, broadcasts and hard coded directions to other data sources. Rather, it maintains methods for data management as part of a process for building an information response to a query. For example, in a classical database scenario where there are two databases, database-A holds customer information, database-B holds sales information. To get the purchase activity for a specific customer, a programmatic logic must be built to retrieve the user information from database-A, and then based upon the response, retrieve the sales information from database-B. This logic would have to be coded utilizing the specific connection information to each-of the databases. If these two database are from different vendors, the code would be extremely complex.

Figure 7:
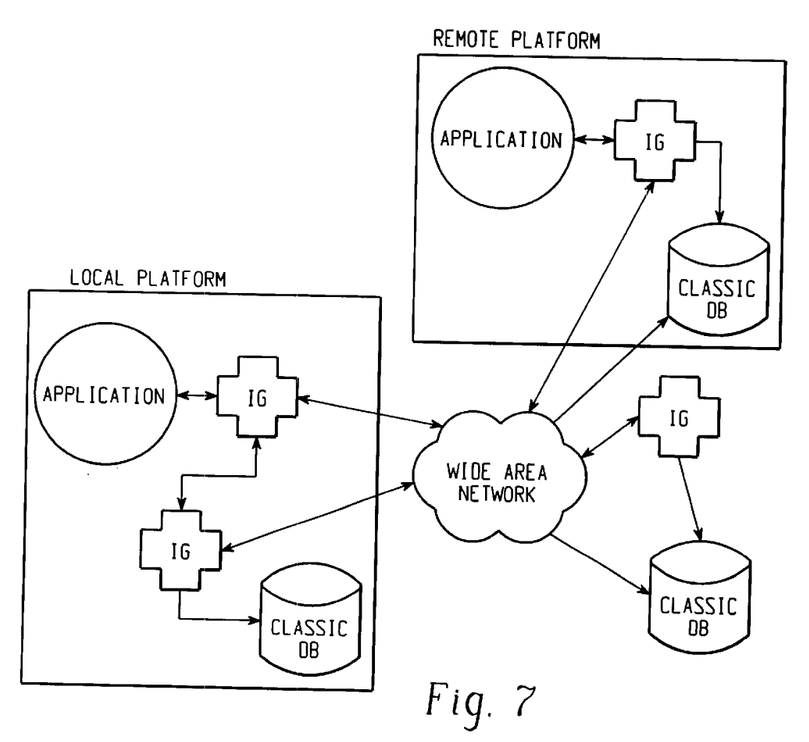
FIG. 7 illustrates a first method utilizing a single information gateway to access data from two classic databases.

The information gateway is capable of handling this same scenario in two different ways. Referring to FIG. 7, the first method would be with a single gateway, which has created atom definitions for each database (database-A and database-B). Thus, an application requesting the same information need only query the Information gateway and not each database individually. The second method would be to have two information,gateways, each created with an atom definition for one of the two databases. (Information Gateway-A and Information Gateway-B), as well as an atomic link to each other. In this configuration, the individual information gateways can concentrate resources on managing the classical database. There is no impact to the client application because the application would see no difference in either implementation or practice.

However, since the same information could be retrieved by querying either Information Gateway-A or Information Gateway-B, the client application could be built to take advantage of this fact since retrieving data over a network is less efficient than retrieval within the same hardware platform.

Referring to FIG. 7, the "Data Path" equivalent in an Information Gateway is shown. The following basic tenets are followed to allow the user tQ effectively and efficiently take advantage of the information gateway model: First, all information gateways may be configured to "publish" any or all atoms to any or all other information gateways. This means, an information gateway (denoted as "IG" in the figure) may actually find a shorter path to a specific set of information by traversing through another information gateway not initially included in the atomic configuration.

Second, an atom may be configured to manage specific information within a classical database based upon a method for managing the target data. The standard process within an information gateway for building an information response will invoke this method as part of the string traversal algorithms discussed supra.

Third, the configuration of an atom impacts only the local information gateway. Therefore, the addition of an information gateway or an atom to an information gateway does not require any processing or knowledge from any external information gateway.

Fourth, any single string traversal, which encounters two distinct methods to retrieve the same information, will reduce the first available method for information retrieval. Similarly, any method encountered by a string traversal, which is not available, will not prevent the string from reaching string termination.

Finally, any single string traversal, which encounters two distinct methods to update, insert, or delete the same information, will reduce all available methods which involve distinct end data storage devices. Further, any method encountered by a string traversal, which is not available, will not prevent the string from reaching string termination.

These rules allow the information gateway to maintain itself independently of all other activity. As such, configuring redundant and highly available information access solution using groups of information gateways is no more complex than configuring a single Information Gateway.

Figure 8:
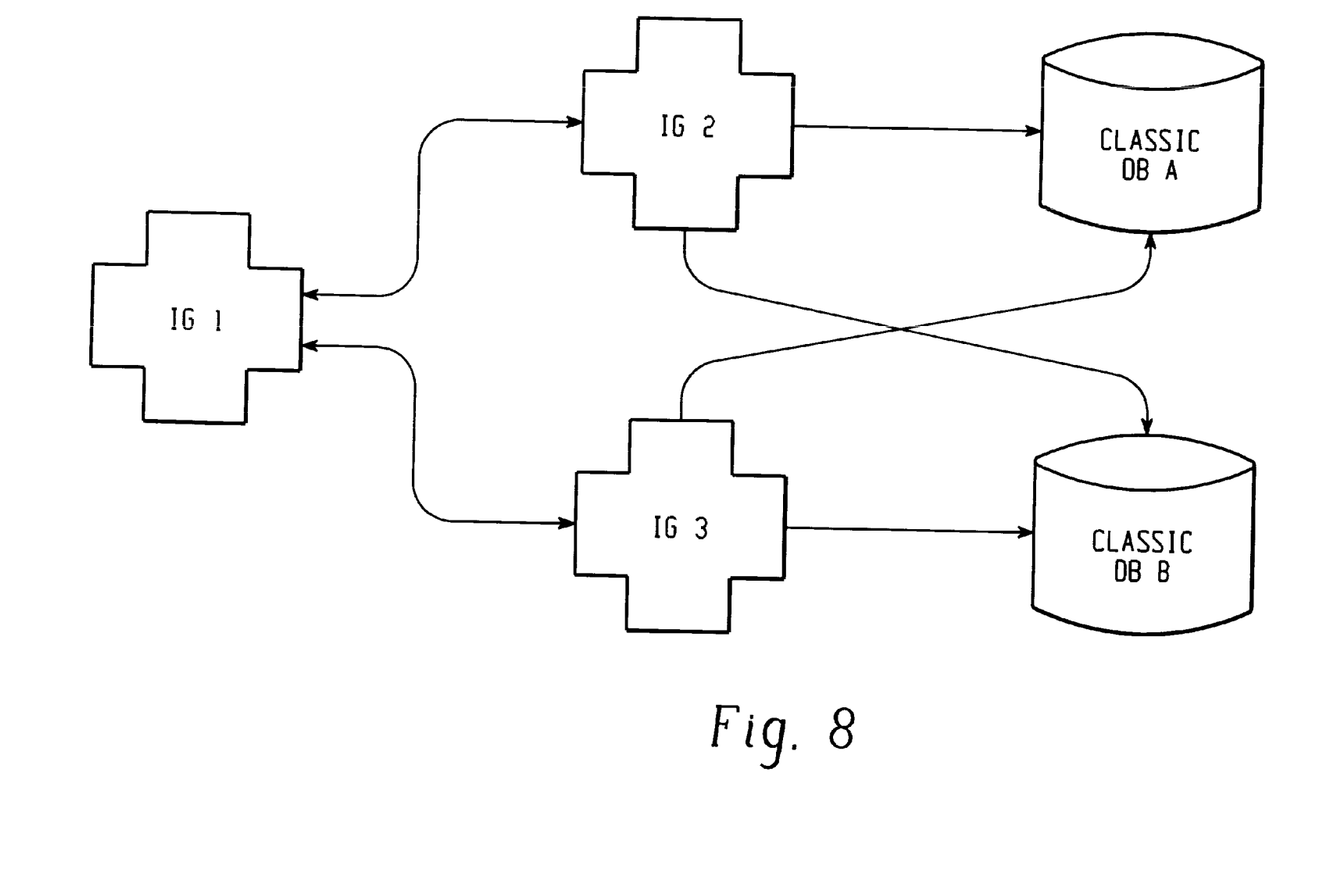
FIG. 8 illustrates a second method utilizes two information gateways to access data from two classic databases.

FIG. 8 illustrates the contemplated implementation of the data path methodology discussed in the preceding paragraph. IG2 and JG3 contain atoms which maintain methods for managing database within both Classic DB-A and Classic DB-B. IG1 maintains atoms for interaction with IG2 and IG3. Thus, if for any reason IG2 or IG3 were to become unavailable, no request originated by IG1 would become unserviceable. If IG1 were to become unavailable, either IG2 or IG3 could be utilized to service requests which did not include IG1 internal specific atoms. For complete redundancy, IG1 would be configured only to house methods for external information access.

It will be appreciated that a particular embodiment of the invention has been described and that further modification may be made therein without departing from the spirit and principle of the invention or necessarily departing from the scope of the appended claims.

Having thus described the invention it is now claimed:

1. An information management system comprising:

receiving means adapted for selectively receiving an atom from each of a plurality of associated information gateways, wherein the atom includes data representative of at least one data element and relationship data representative of at least one relationship associated therewith;

association means adapted for generating the relationship associated with received atoms in accordance with parameter data representative of pre-selected definitions specifying at least one of allowable data values and standard allowable inferences;

storage means adapted for storing at least one atom in at least one information gateway such that associated relationship data between the at least one atom and a related atom in a corresponding information gateway is maintained and the at least one atom is stored in accordance therewith, wherein the atoms are adaptively extracted and selectively used to populate internal storage of a database;

allocation means adapted for allocating data storage within the storage means for at least one of a pointer, and data element; wherein the relationship is populated with data associated with the related atom;

retrieving means adapted for retrieving viewpoint data resultant from a query of at least one atom in at least one information gateway together with data representative of identified relationships, wherein the data representative of identified relationships selectively includes at least one of the data elements and relationship data associated with the viewpoint data; and output means adapted for outputting data and relationship data associated with viewpoint data.

2. A method for information management comprising the steps of:

selectively receiving an atom from each of a plurality of associated information gateways, wherein the atom includes data representative of at least one data element and relationship data representative of at least one relationship associated therewith;

generating the relationship associated with received atoms in accordance with parameter data representative of pre-selected definitions specifying at least one of allowable data values and standard allowable inferences;

storing at least one atom in at least one information gateway such that associated relationship data between the at least one atom and a related atom in a corresponding information gateway is maintained and the at least one atom is stored in accordance therewith;

adaptively extracting, and selectively using the atoms to populate internal storage of a database;

allocating data storage within the storage means for at least one of a pointer, and data element; wherein the relationship is populated with data associated with the related atom;

retrieving viewpoint data resultant from a query of at least one atom in at least one information gateway together with data representative of identified relationships, wherein the data representative of identified relationships selectively includes at least one of the data elements and relationship data associated with the viewpoint data; and outputting data and relationship data associated with viewpoint data.

* * * * *